US005448818A

United States Patent [19]

Scheffelin et al.

[11] Patent Number: 5,448,818

[45] Date of Patent: Sep. 12, 1995

[54] METHOD OF ASSEMBLY OF A COLLAPSIBLE INK RESERVOIR STRUCTURE

[75] Inventors: Joseph E. Scheffelin; George T. Kaplinsky, both of San Diego; David W. Swanson, Escondido; Tofigh Khodapanah, all of San Diego, all of Calif.; James E. Clark, Albany, Oreg.

[73] Assignee: Hewlett-Packard Company, Palo Alto, Calif.

[21] Appl. No.: 145,359

[22] Filed: Oct. 29, 1993

Related U.S. Application Data

[63] Continuation-in-part of Ser. No. 929,615, Aug. 12, 1992, abandoned, and a continuation-in-part of Ser. No. 995,868, Dec. 23, 1992.

[51] Int. Cl.[6] ........................ B23P 11/02; B21D 39/00

[52] U.S. Cl. .................................... 29/509; 29/890.1; 29/890.126; 29/773; 29/469.5; 228/173.1; 347/86

[58] Field of Search .............. 29/509, 462, 806, 890.1, 29/DIG. 48, 890.12, 890.126, 773; 347/86, 87; 346/140 R; 72/352; 228/173.1, 173.2

[56] References Cited

U.S. PATENT DOCUMENTS

| | | | |
|---|---|---|---|
| 3,922,767 | 12/1975 | Solter et al. | 29/890.12 X |
| 4,032,928 | 6/1977 | White et al. | 29/890.1 |
| 4,422,084 | 12/1983 | Saito | 347/87 |
| 4,615,113 | 10/1986 | Fennel | 29/462 X |
| 4,703,332 | 10/1987 | Crotti et al. | 347/87 |
| 4,768,751 | 9/1988 | Giachino et al. | 29/890.1 |
| 4,794,409 | 12/1988 | Cowger et al. | 347/87 |
| 5,136,778 | 8/1992 | Bell et al. | 29/806 |
| 5,231,416 | 7/1993 | Terasawa et al. | 347/87 |
| 5,325,119 | 6/1994 | Fong | 347/86 |

*Primary Examiner*—Timothy V. Eley
*Assistant Examiner*—Khan V. Nguyen
*Attorney, Agent, or Firm*—Dennis G. Stenstrom

[57] ABSTRACT

A method of assembling a collapsible ink reservoir for a liquid ink printer cartridge comprising the steps of attaching a first sidewall to a frame member along a sealable junction to form an open assembly; assembling a pressure regulator; inserting the pressure regulator of said assembly step into the open assembly of said attaching step; and affixing a second sidewall to the open assembly of said attaching step to form an enclosed assembly.

17 Claims, 14 Drawing Sheets

METHOD OF ASSEMBLY OF A COLLAPSIBLE INK RESERVOIR STRUCTURE

CROSS REFERENCE TO RELATED APPLICATIONS

This is a continuation-in-part of commonly assigned applications COLLAPSIBLE INK RESERVOIR STRUCTURE AND PRINTER INK CARTRIDGE, Ser. No. 07/929,615, filed Aug. 12, 1992, is now abandoned, by George T. Kaplinsky et al.; and LAMINATED FILM FOR INK RESERVOIR, Ser. No. 07/995,868, filed Dec. 23, 1992, by Joseph Scheffelin; which are hereby incorporated herein by reference.

The present invention is related to the following co-pending and commonly assigned U.S. patent applications TWO MATERIAL FRAME HAVING DISSIMILAR PROPERTIES FOR THERMAL INK-JET CARTRIDGE, Ser. No. 07/994,807, filed Dec. 22, 1992, by David W. Swanson, et al.; INK PRESSURE REGULATOR FOR A THERMAL INK-JET PRINTER, Ser. No. 07/928,811, filed Aug. 12, 1992, abandoned, by Tofigh Khodapanah en al.; SPRING-BAG PRINTER INK CARTRIDGE WITH VOLUME INDICATOR, by David S. Hunt et al., application Ser. No. 07/717,735, filed Jun. 19, 1991, U.S. Pat. No. 5,389,353; and NEGATIVE PRESSURE INK DELIVERY SYSTEM, by George T. Kaplinsky et al., application Ser. No. 07/995,851, filed Dec. 23, 1992, abandoned; which are hereby incorporated herein by reference.

1. Field of the Invention

The present invention relates generally to ink reservoirs for high speed ink printers and plotters, and more particularly, to ink reservoir materials.

2. Background of the Invention

In printers containing ink reservoirs, the ink reservoir is ordinarily maintained under a sub-atmospheric or negative pressure so that ink will not leak or drool from the print head. Various types of ink reservoirs may be used including onboard ink reservoir cartridges which are mounted on the moveable printer carriage and remote or offboard ink reservoirs from which ink is brought to the print head on the printer carriage by tubing. In the onboard cartridges a polymer foam is ordinarily provided in the ink reservoir so that the capillary action of the foam will prevent ink from drooling from the print head. Polymeric foams of the type typically used for this purpose are non-biodegradable and thus cause environmental problems whenever a previously used cartridge is emptied and thrown away. In addition, the use of industrial foam in the ink reservoir restricts the operating pressure range of the ink cartridge and such foams ordinarily leave a chemical residue which is incompatible with and/or reacts adversely with printer ink. Similarly, the relatively long tubing used to convey ink from an offboard pressure reservoir to a printing head is not easily adaptable to deliver ink to the print head at different printing pressure ranges.

A collapsible ink reservoir for an inkjet printer is disclosed in U.S. Pat. No. 4,422,084 issued Dec. 20, 1983 to Saito. Negative pressure is maintained in a polypropylene ink bag by various types of springs which bias the bag walls apart from each other. The springs may be mounted inside of or externally of the ink bag but the spring pressure regulator construction does not result in substantially complete emptying of the ink bag and the bag itself is not carried on a printer carriage.

One example of an improved onboard ink reservoir cartridge is disclosed in U.S. patent application Ser. No. 07/717,735 filed Jun. 19, 1991 entitled SPRING-BAG PRINTER INK CARTRIDGE WITH VOLUME INDICATOR filed by David S. Hunt and W. Bruce Reid and assigned to the assignee of the present invention. The cartridge disclosed in that application basically comprises a rectangular housing containing a flexible bag of ink, an ink filter and a print head which receives ink from the filter. A spring inside of the bag of ink urges its flexible walls apart from each other thus maintaining a negative or sub-atmospheric pressure in the reservoir which is overcome as ink is emitted from the print head.

Additional details of this collapsible bag technology are disclosed in U.S. patent applications Ser. No. 07/994,810, filed Dec. 22, 1992, entitled METAL COVER ATTACHMENT TECHNIQUE FOR THERMAL INKJET PEN by inventors Dale D. Timm, Jr., et al.; Ser. No. 07/994,808, filed Dec. 22, 1992, entitled RIGID LOOP CASE STRUCTURE FOR THERMAL INK-JET PEN by inventors David W. Swanson, et al.; Ser. No. 07/994,807, filed Dec. 22, 1992, entitled DOUBLE COMPARTMENT INK-JET CARTRIDGE WITH OPTIMUM SNOUT by inventors David W. Swanson, et al.; Ser. No. 07/997,257, filed Dec. 23, 1992, entitled COLLAPSIBLE INK RESERVOIR AND INK-JET CARTRIDGE WITH PROTECTIVE BONDING LAYER FOR THE PRESSURE REGULATOR by inventors James H. Sykora, et al.; all of owned by the assignee of the present invention and which are hereby incorporated herein by reference.

In order to provide an acceptable printer ink cartridge utilizing a collapsible ink bag or reservoir, there is a need for an ink bag or reservoir that is as flexible as possible in order to allow the reservoir bag to collapse in unimpeded manner to minimize stranded ink in the reservoir and to maintain the desired degree of negative pressure within the reservoir bag. The reservoir bag must also provide a strong moisture and gas barrier in order to prevent water loss form the reservoir, and prevent external contaminants such as air from entering the reservoir. Suitable materials for the reservoir should be materials capable of allowing the reservoir's peripheral edges to be sealed in order to form an ink reservoir that does not separate during normal use. In addition, the material used for the reservoir should be easily sealable in order to prevent leakage or migration of the ink from the reservoir and chemically compatible and non-reactive with the ink contained therein.

Further, the reservoir should be puncture resistant because despite careful handling and packaging, the relatively rigid pressure regulator sideplates may during shipment, handling, or installation puncture the thin flexible reservoir walls. Although such puncturing is quite rare, this puncturing must be totally avoided without unduly thickening the reservoir walls so as to inhibit ink from being completely exhausted from the collapsible reservoir.

Finally, by providing a reservoir bag with adequate moisture/gas barrier allows the ink cartridges to be packaged without any special barrier packaging. This special barrier packaging currently requires packaging in sealed aluminum containers. Special packaging for protection from physical damage to the ink reservoir currently involves a plastic insert within the aluminum barrier protection. Elimination of this special packaging provides both environmental and cost benefits.

SUMMARY OF THE INVENTION

A method of assembling a collapsible ink reservoir for a liquid ink printer cartridge comprising the steps of attaching a first sidewall to a frame member along a sealable junction to form an open assembly; assembling a pressure regulator; inserting the pressure regulator of said assembly step into the open assembly of said attaching step; and affixing a second sidewall to the open assembly of said attaching step to form an enclosed assembly.

DESCRIPTION OF THE PREFERRED EMBODIMENT

Figure 1:
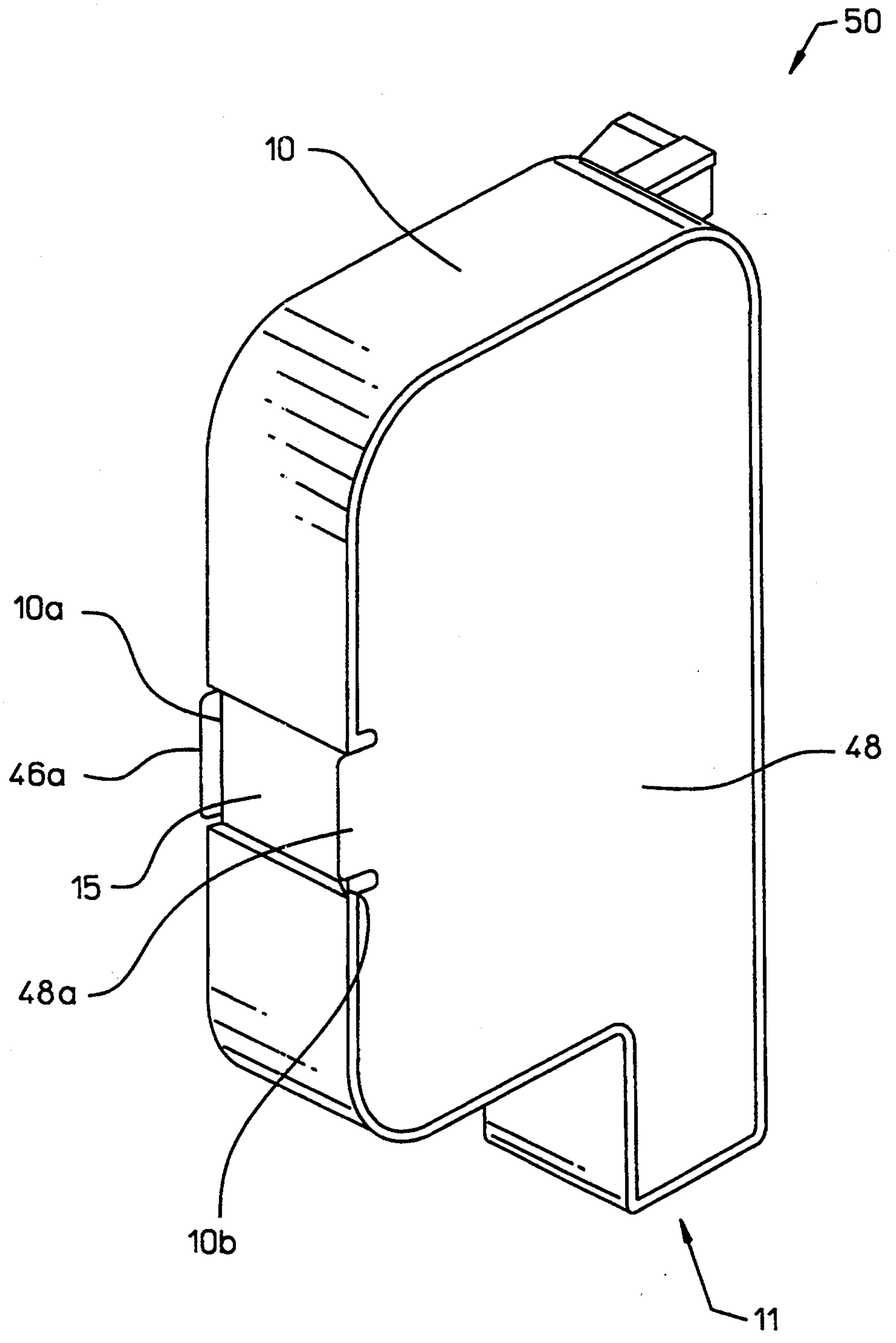
FIG. 1 is a perspective view of the ink cartridge assembly of the present invention.

Referring to FIG. 1, an ink cartridge 50 is depicted for enclosing a spring biased collapsible ink reservoir. This ink cartridge is usually made of opaque material such as plastic or metal and is comprised of an outer peripheral frame 10 and a pair of parallel opposed cover plates 46 (not shown) and 48 which are affixed to the outer peripheral frame 10 by welding, gluing or press fitting after installation of the internal components. A preferred method of affixing cover plates 46 (not shown), 48 to outer peripheral frame 10 is described in an U.S. patent application Ser. No. 07/994,810, filed Dec. 22, 1992, entitled METAL COVER ATTACHMENT TECHNIQUE FOR THERMAL INK-JET PEN, by inventors Dale D. Timm, et al. The snout portion 11 of the ink cartridge 50 has an ink discharge aperture 12 (not shown) in its end portion (at the bottom in FIG. 1) to which is affixed an electrically driven print head (not shown).

Figure 2:
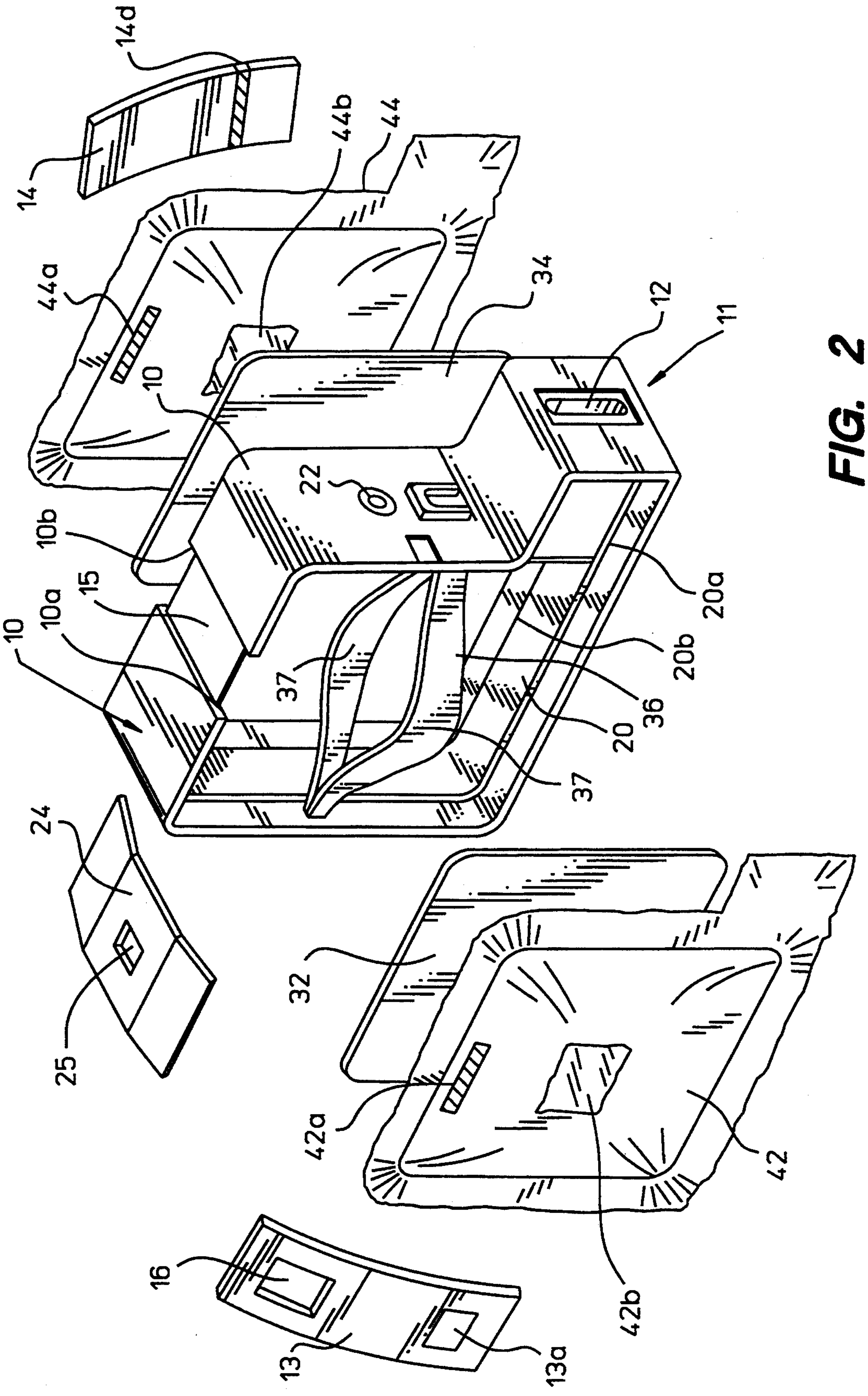
FIG. 2 is an exploded view of the ink cartridge and collapsible reservoir assembly of the present invention.

Referring to FIG. 2, the sidewalls of the reservoir are identified at 42, 44. A collapsible reservoir system comprised of a relatively rigid inner peripheral frame 20 and a pair of ink reservoir sidewalls 42, 44 attached to inner peripheral frame 20. Preferably, inner peripheral frame 20 is molded with the outer peripheral frame 10 in a two step injection molding process. Preferably inner peripheral frame 20 is formed of a softer and lower melting point plastic than the plastic of outer peripheral frame 10 to permit heat bonding of the reservoir sidewalls 42, 44 thereto along the side edges 20*a*, 20*b* of inner peripheral frame 20. Alternatively, inner frame 20 may be separately constructed with some flexibility to assist in mounting it in the peripheral frame 10, but the frame 20 is rigid relative to the flexible ink reservoir sidewalls described below. The inner peripheral frame 20 has a pair of opposite side edges 20*a*, 20*b* to which the flexible ink reservoir sidewalls 42, 44 are respectively joined as by heat welding at their peripheral edges to form the external reservoir structure. A preferred method of constructing inner and outer peripheral frames 20, 10 is described in an U.S. patent application Ser. No. 07/994,807, filed Dec. 22, 1992, entitled TWO MATERIAL FRAME HAVING DISSIMILAR PROPERTIES FOR THERMAL INK-JET CARTRIDGE by inventors David W. Swanson, et. al, which is herein incorporated by reference.

Figure 3:
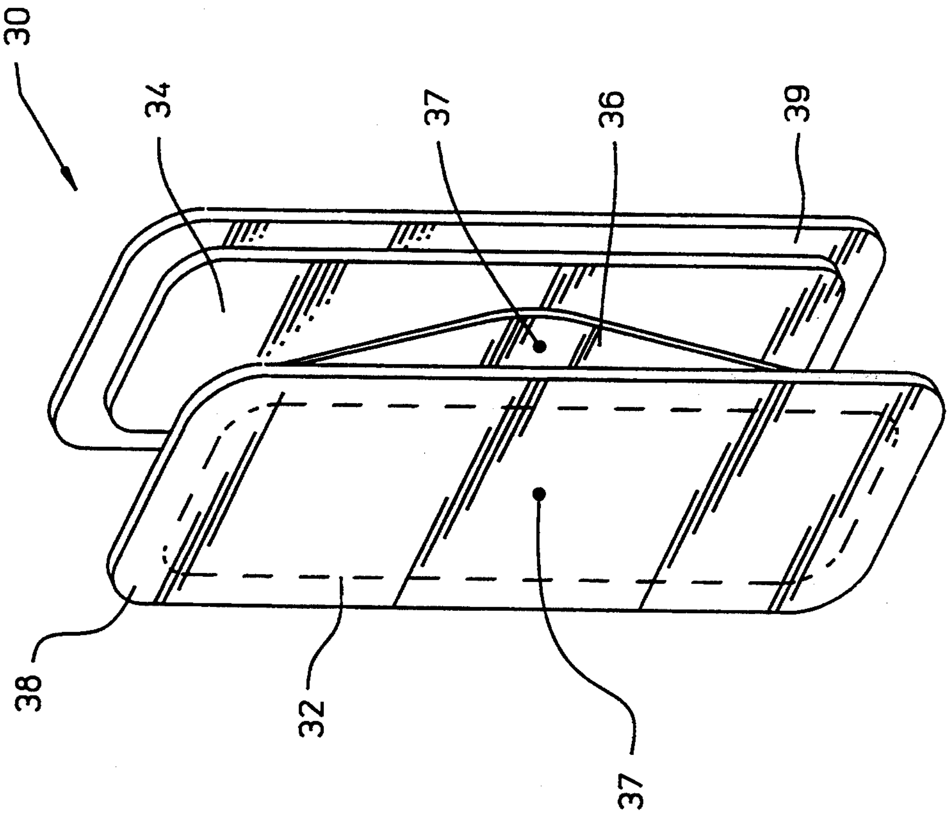
FIG. 3 is a perspective view of the pressure regulator assembly.

FIG. 3 shows the pressure regulator 30 assembly. The pressure regulator sideplates 32, 34 may be individually cut from a continuous strip of metal such as stainless steel, each plate being of generally rectangular configuration with rounded corners to minimize damaging the flexible reservoir sidewalls. The bow springs 36 also may conveniently be cut from a common strip of metal such as stainless steel. The bow spring 36 may be affixed, preferably by spot or laser welding at the apexes of each of its bights 37 centrally onto each of the sideplates 32, 34. An optional protective bonded layer in the form of a thin, but tough polyethylene cover layer 38, 39 having an acrylic adhesive on one surface thereof is press bonded to the outer surface of each sideplate 32, 34. The protective cover layers 38, 39 are each sized slightly larger than the sideplates 32, 34 so that a marginal width of a few millimeters of the protective cover layers 38, 39 extends beyond each edge of the metal plates 32, 34 to prevent those edges from contacting the comparatively delicate reservoir wall sidewalls 42, 44.

The pressure regulator 30 is centrally positioned in the inner peripheral frame 20 and the two flexible ink reservoir sidewalls or 42, 44 are heat bonded or cemented at their peripheral edges to the outer edge walls 20*a*, 20*b* of the inner peripheral frame 20, respectively, with care being taken to maintain the central positioning at all time of the regulator 30 in inner peripheral frame 20 between the flexible sidewalls 42, 44, The reservoir sidewalls 42, 44 may be securely affixed to the pressure regulator 30 sideplates 32, 34 preferably by heat bonding the reservoir sidewalls 42, 44 to the protective cover layers 38, 39, and the protective cover layers 38, 39 to sideplates 32. 34 in the area shown as 42*b*, 44*b* in FIG. 2. This heat sealing has the primary purpose of preventing relative motion between the metal sideplates 32, 34 and the relatively delicate reservoir sidewalls 42, 44 in order to prevent the edges of the sideplates from cutting or puncturing the sidewalls. The cover plates 46, 48 are affixed to the outer peripheral frame 10 as described above. A preferred method of constructing ink cartridge 50 is described in an U.S.

patent application Ser. No. 07/994,808, filed Dec. 22, 1992, entitled RIGID LOOP CASE STRUCTURE FOR THERMAL INK-JET PEN by inventors David W. Swanson, et. al, which is herein incorporated by reference.

Figure 4:
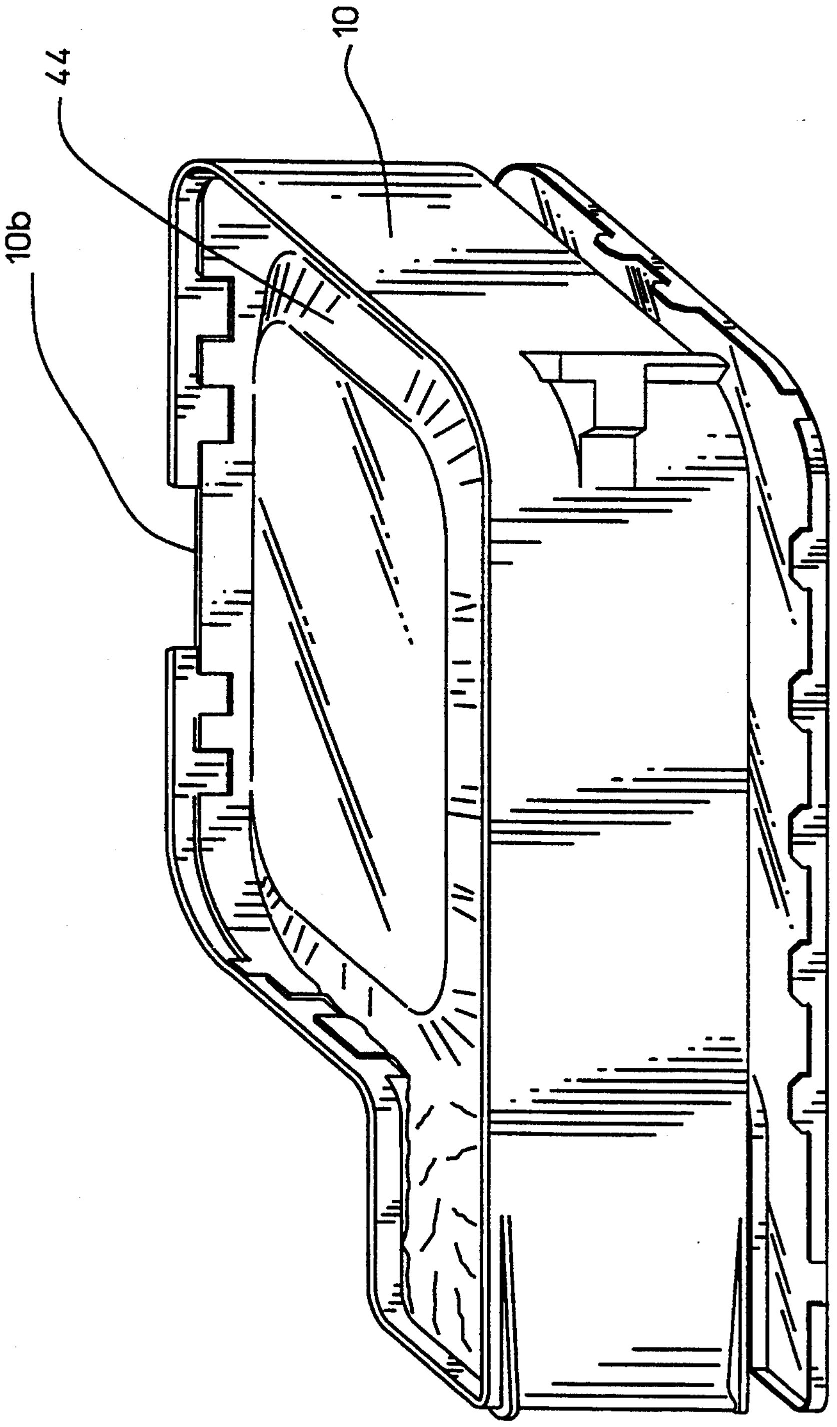
FIG. 4 is a perspective view of ink cartridge with cover plates removed to show collapsible ink reservoir of the present invention attached to the inner peripheral frame.
Figure 6:
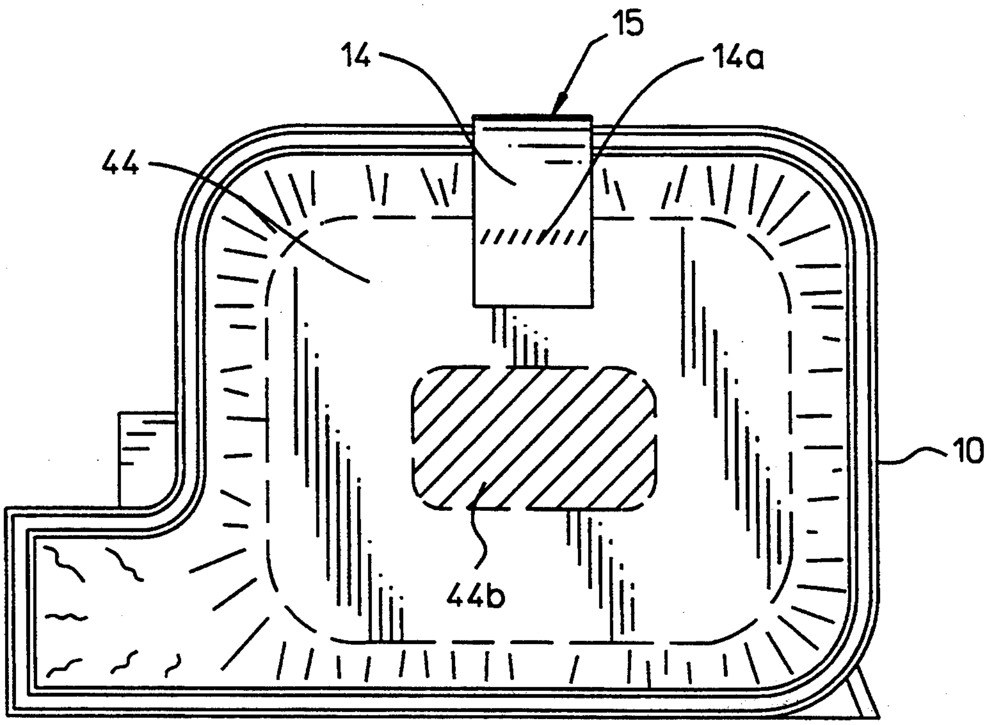
FIG. 6 is a side view of the ink cartridge without the outer cover plate.

Referring to FIGS. 1, 2 and 4, peripheral outer frame 10 is provided with a pair of spaced parallel slots 10*a* and 10*b* on opposite sides of reduced thickness channel 15. Cover plates 46, 48 provide tab extensions 46*a*, 48*b*, respectively, as shown in FIG. 1. Tabs 46*a* and 48*a* align with slots 10*a*, 10*b*, respectively, to provide a passageway for thin indicator strips 13 and 14 which are cemented or heat sealed to opposite reservoir sidewalls 42, 44, respectively. The sealed areas of indicator strip 13, 14 and sidewalls 42, 44 are shown as areas 13*a*, 14*a* and 42*a*, 44*a*, respectively, in FIGS. 2 and 6.

Figure 5:
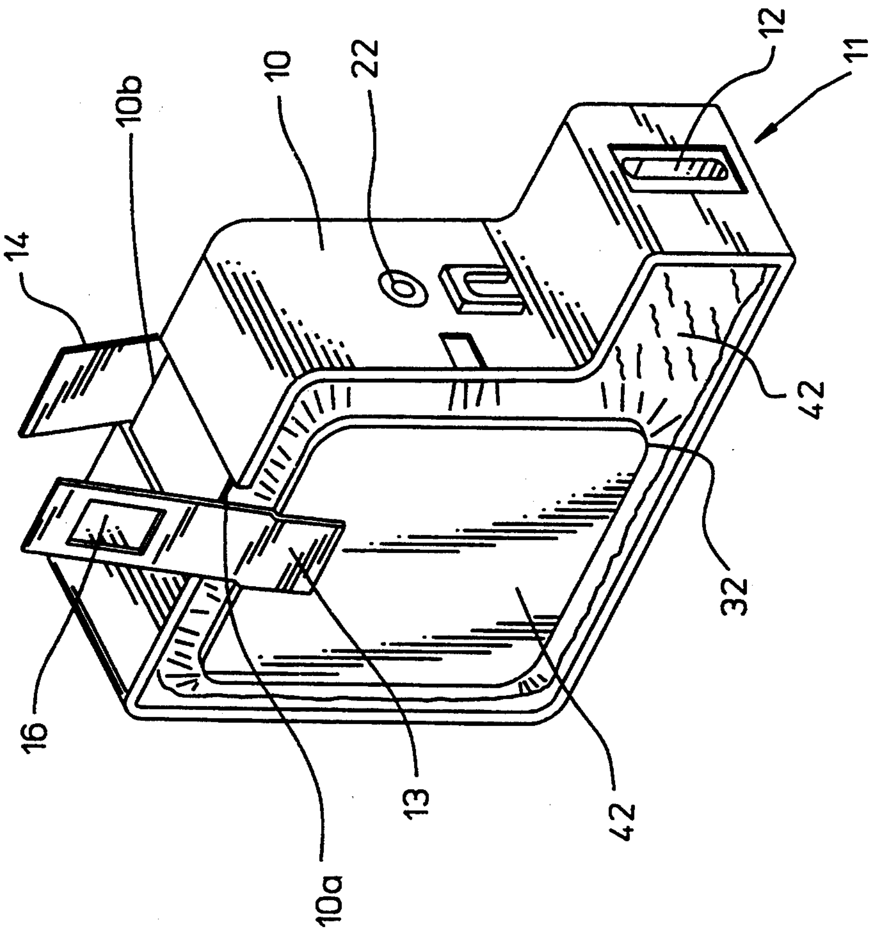
FIG. 5 is a perspective view of the ink cartridge assembly and ink level indicator device with the cover plate removed.

Referring to FIGS. 1 and 5, indicator strips 13, 14 pass between tabs 46*a*, 48*a* and slots 10*a*, 10*b* and fold over each other into reduced channel 15. Indicator strip 14 is the lower or inside indicator strip having a color (e.g., green) which provides an indicia visible through a window 16 in indicator strip 13 when the indicator strips 13, 14 are in place. Indicator strip 13 is preferably of the same color (e.g., black) as the peripheral frame material. Reduced thickness channel 15 in peripheral outer frame 10 receives the overlying indicator strips 13 and 14. A window device 24 having a stationary viewing window 25 therein is placed over and aligned with the reduced thickness channel 15 to provide a passageway for movement of the indicator strips 13, 14. The movement of the window 16 in indicator strip 13 permits visual observation of the movement of indicator strip 13 and of the contrasting color (e.g., green) indicator strip 14.

The reservoir is filled with ink via port 22 which is subsequently plugged for shipment. The required means which fire the ink droplets through the orifices 12 is conventional.

As ink is withdrawn from the reservoir, the flexible sidewalls 42, 44 of the ink reservoir and the pressure regulator sideplates 32, 34 gradually move towards each other until the spring is in an essentially flat configuration with the two sideplates 32, 34 coming virtually into contact with each other so that the reservoir is substantially completely emptied of ink.

The material used for reservoir sidewalls 42, 44 should be flexible, relatively puncture resistant, impermeable to moisture and chemically compatible and nonreactive with the ink contained therein to prevent leakage or migration of the ink out of the reservoir, and impermeable to external contaminants such as air, dust, liquids and the like. Moreover, the reservoir material must to meet cartridge shelf-life requirements for water loss and air gain over approximately eighteen months of storage and shipping plus six months in a heated printer environment. Excessive water loss will change ink composition and thereby degrade print quality. Excessive air gain leads to loss of back-pressure and ink leakage from the print head.

The seal between reservoir sidewalls 42, 44 and inner peripheral frame 20 must also survive shelf-life requirements with sufficient strength to pass rough handling such as dropping, vibration, shock, altitude and high temperature. While it is possible to use adhesives for sealing, it is advantageous if the reservoir material allows for the heat sealing of the sidewalls 42, 44 to: the inner peripheral frame 20 frame, sideplates 30, 32, protective cover layers 38, 39, and indicator strips 13, 14. Moreover, it is further required that sidewalls 42, 44 be heat sealable onto themselves in order to seal through the "wrinkles" that naturally occur at the curved peripheries of the sidewalls 42, 44. Finally, the reservoir material must be suitable for a high speed automated assembly process.

Various combinations of materials were tried in order to meet the reservoir sidewall requirements for flexibility, moisture/gas barrier, chemical resistance, mechanical toughness, heat sealability and cost.

With respect to the barrier requirement, a single layer of aluminum foil far exceeds the barrier requirement, but the minimum thickness of ⅓ mil is far too rigid to meet the flexibility requirements for the sidewalls. Other materials investigated were various plastic carrier films coated with materials such as aluminum, polyvinylidene chloride (PVDC or Saran), glass, and fluorohalocarbon (Aclar).

Polyethylene teraphthalate (PET or Polyester), Polypropylene (PP), Nylon and polyethylene (PE) were investigated as possible carriers. Based on numerous tests of different combinations PET was chosen as the preferred carrier material.

For sealability, adhesive laminating of the layers allowed for more choices of sealant materials, but the resulting structure was more rigid than when extrusion coating was used. Thus, the extrusion coating method was chosen and low density polyethylene (LDPE) was chosen as the sealant. As discussed above, sealing through "wrinkles" required a two-sided coating of sealant.

Numerous combinations of LDPE, PET, aluminum (ALU) and LDPE were investigated with varying degrees of success in obtaining the desired functional requirements discussed above. Among the combinations investigated LDPE-PET-ALU//ALU-PET-LDPE was chosen as the preferred embodiment for the reservoir sidewalls. In the above preferred embodiment "—" means a coating was applied to a film and "//" means two films were adhesively laminated. The symmetry of the preferred embodiment also resulted in less curl and easier assembly of the reservoir sidewalls.

The above preferred embodiment for the reservoir sidewalls is manufactured by the following process. Polyethylene teraphthalate (PET or Polyester) in pellet form is blown extruded into a 48 gauge thick film, biaxially stretched film. The PET film is then coated with a 135 angstrom thick aluminum coating by vacuum deposition on one side. Two aluminum coated PET films are adhesively laminated together (aluminum to aluminum) using a 0.1 mil thick polyester based adhesive. The PET lamination is extrusion coated with a 0.05 mil thick polyester based adhesive primer, and then with a 0.7 mil thick Low Density Polyethylene (LDPE) on each side. The finished laminated film is then cut into the desired shape and size.

The following is a description of the method of assembly for the collapsible ink reservoir structure comprising the inner-peripheral frame 20, the ink reservoir sidewalls 42, 44 and the pressure regulator assembly 30. The pressure regulator assembly 30 comprises the sideplates 32, 34, the bow spring 36, and protective cover layers 38, 39. The assembly proceeds as shown in FIG. 7.

Figure 8:
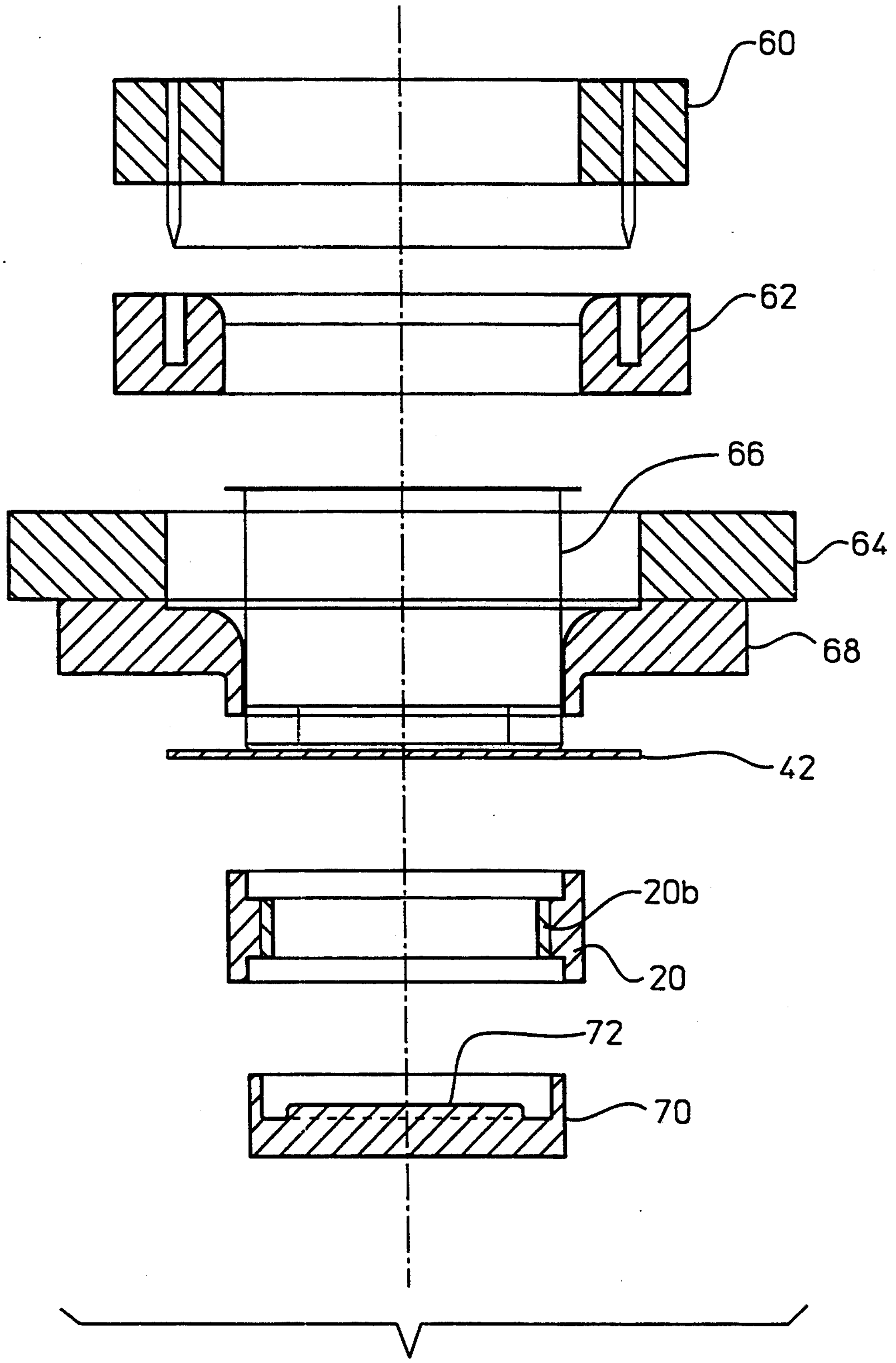
FIG. 8 is a sectional schematic view of a sidewall attachment mechanism.
Figure 9A:
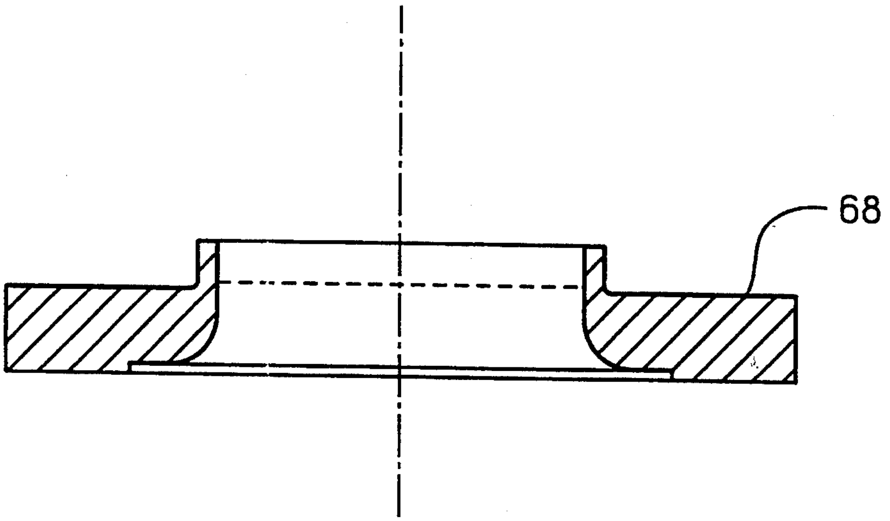
FIG. 9 is a sectional view of the heat stake die.
Figure 9B:
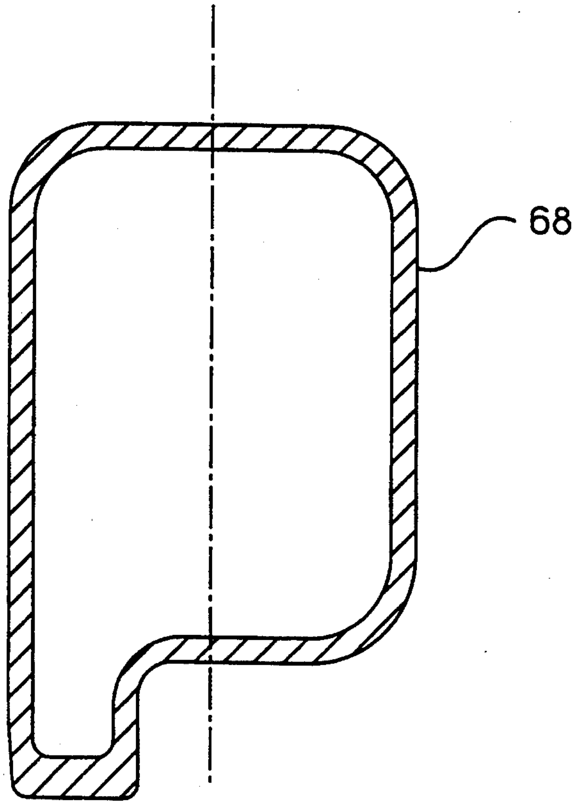
Figure 10:
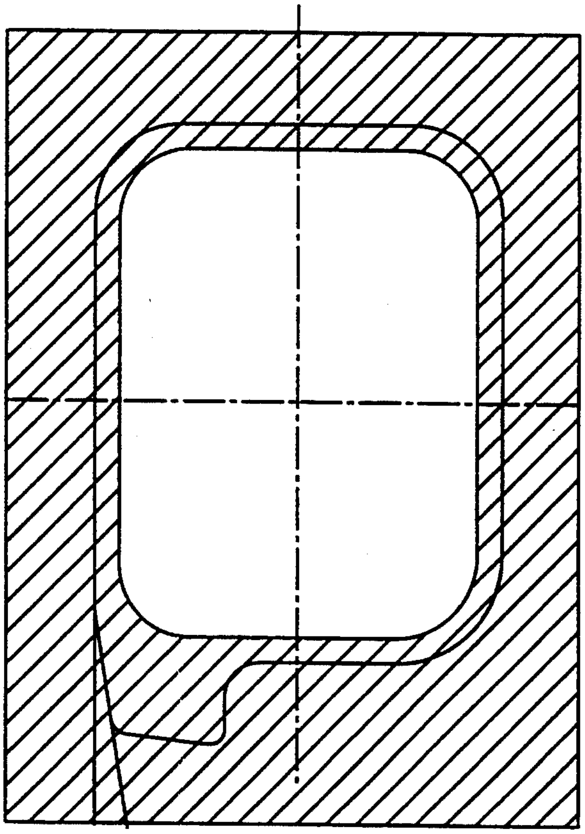
FIG. 10 is a top view of a sidewall cut by the die cutter of FIG. 8.

In step 100, the first sidewall 42 is attached to the inner frame 20 along peripheral edge 20*a*. Referring to FIG. 8, the procedure takes place in a continuous manner wherein die cutter 60 and anvil 62 cut the film 42 to the appropriate shape. Push form 66 then pushes film 42 into the inner frame 20 while simultaneously frame lift block 70 comes upward to register and support frame 20, to preform the film 42 in the same manner as the sideplate 32 will when collapsing into the reservoir. Push form 66 will be approximately at the center of inner frame 20 at the point of heat staking. The relative movement between push form 66 and heat stake die 68 must be sufficient for the edges of sidewall 42, which has larger dimensions than heat stake die 68, to clear the interior surfaces of heat stake die 68 and flatten out after traveling through heat stake die 68 prior to heat staking. Surface 72 of frame liftblock 70 is generally of the same shape as sideplate 32. The shape of heat stake die 68 is shown in FIG. 9. The shape of sidewall 42 after cutting by die cutter 60 is shown in FIG. 10. The purpose of push form 66 and frame lift block 70 is to pre-shape the film 42 with the wrinkles through the corners to provide a conforming fit when sideplate 32 is exerting pressure against the sidewall after final assembly. This is a key step because the preforming of the wrinkles before heat staking creates a sidewall that will easily move without restriction inward as the ink reservoir is depleted. While being held in the appropriate position by push form 66 and frame lift box 70 the heater block 64 and heat stake die 68 heat stakes the sidewall 42 to surface 20*a* of inner frame 20.

Figures 11A, 11B:
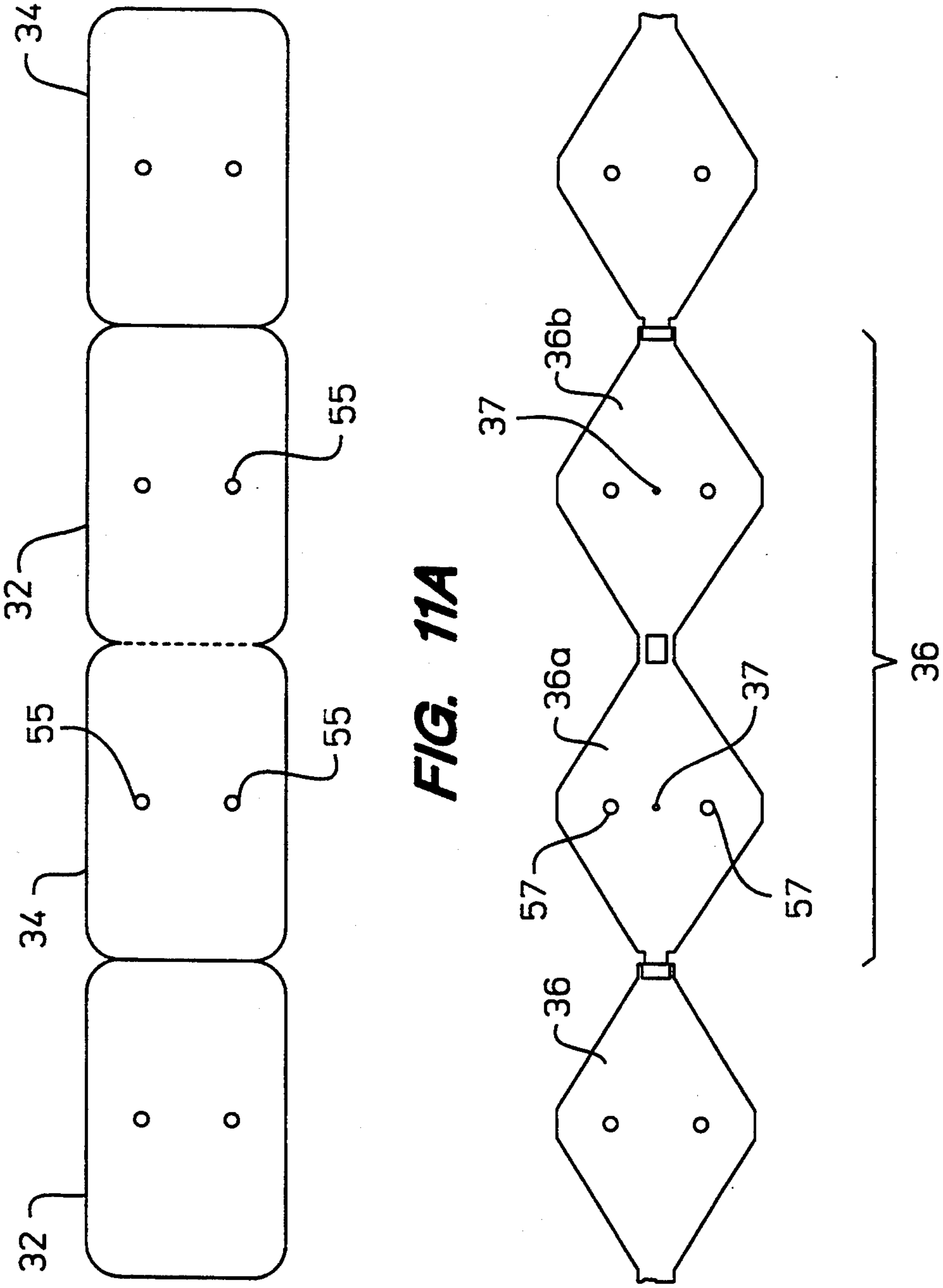
FIG. 11 is a top view of the sideplates and bow spring.
Figure 12B:
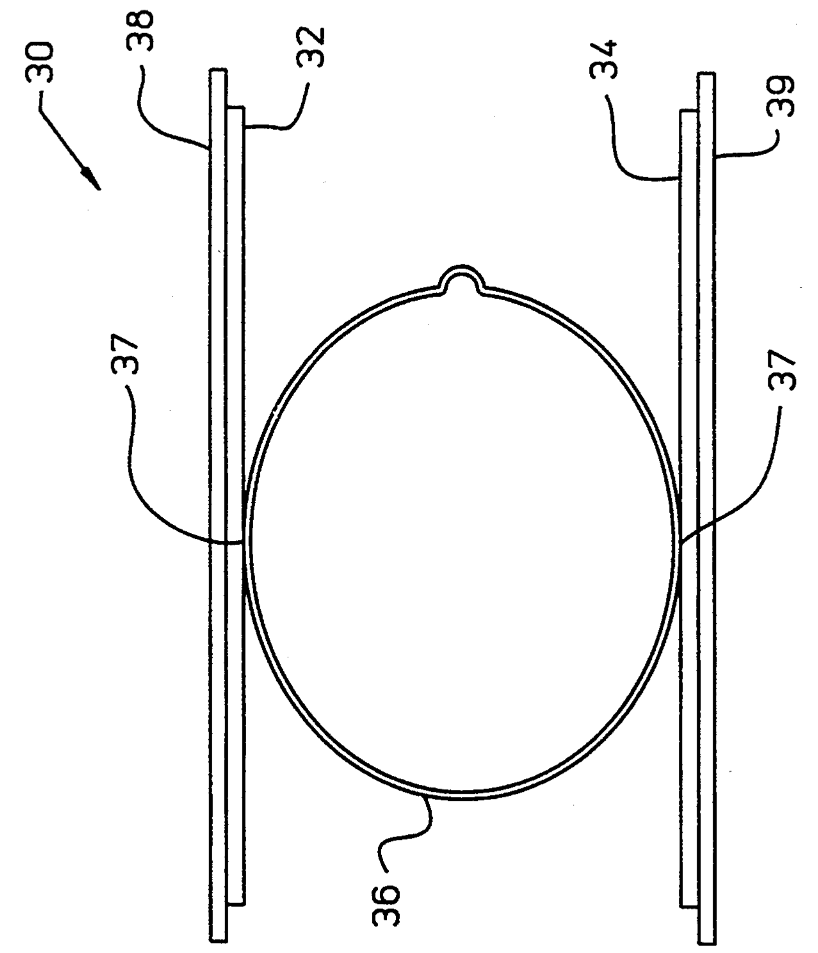
FIG. 12 is a schematic front and side view of the pressure regulator.
Figure 12A:
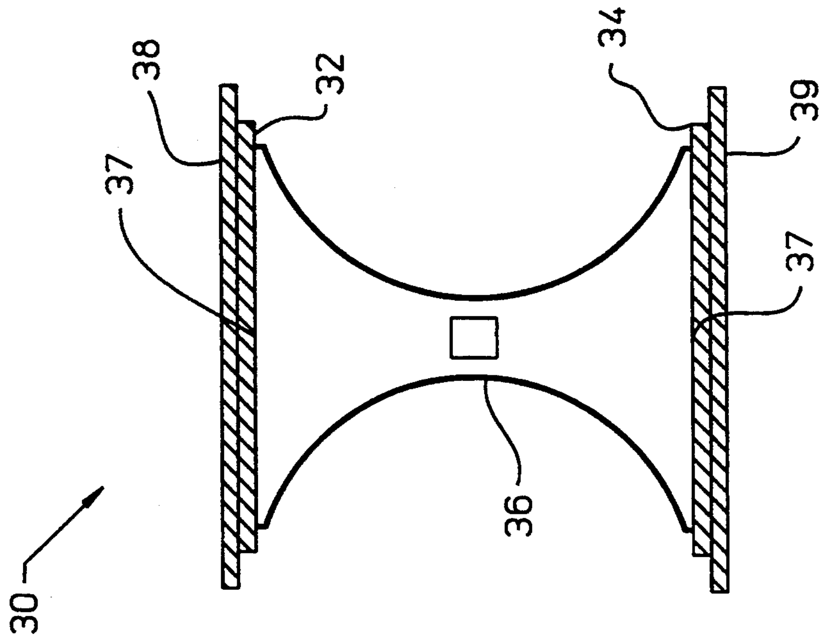

In step 110, which occurs simultaneously with step 100, the pressure regulator 30 is assembled by a different machine. Referring to FIG. 11, the sideplates 32, 34 and bow spring 36 are fed to the pressure regulator forming machine from two separate continuous strips. The alignment holes 55 in sideplates 32, 34 and alignment holes 57 in bow spring 36 are used for alignment of the pressure regulator 30 during assembly and for future manipulation of the pressure regulator when the protective cover layers 38, 39 are applied in step 120. In the assembly step of bow spring 36, each half of the spring 36*a* and 36*b* are bent into the shape shown in FIG. 12. The sideplates 32, 34 are aligned with bow spring 36 using alignment holes 55, 57. After alignment, bow spring 36 is spot-welded centrally to sideplates 32, 34 at the apexes of each of its bights 37.

Figure 7:
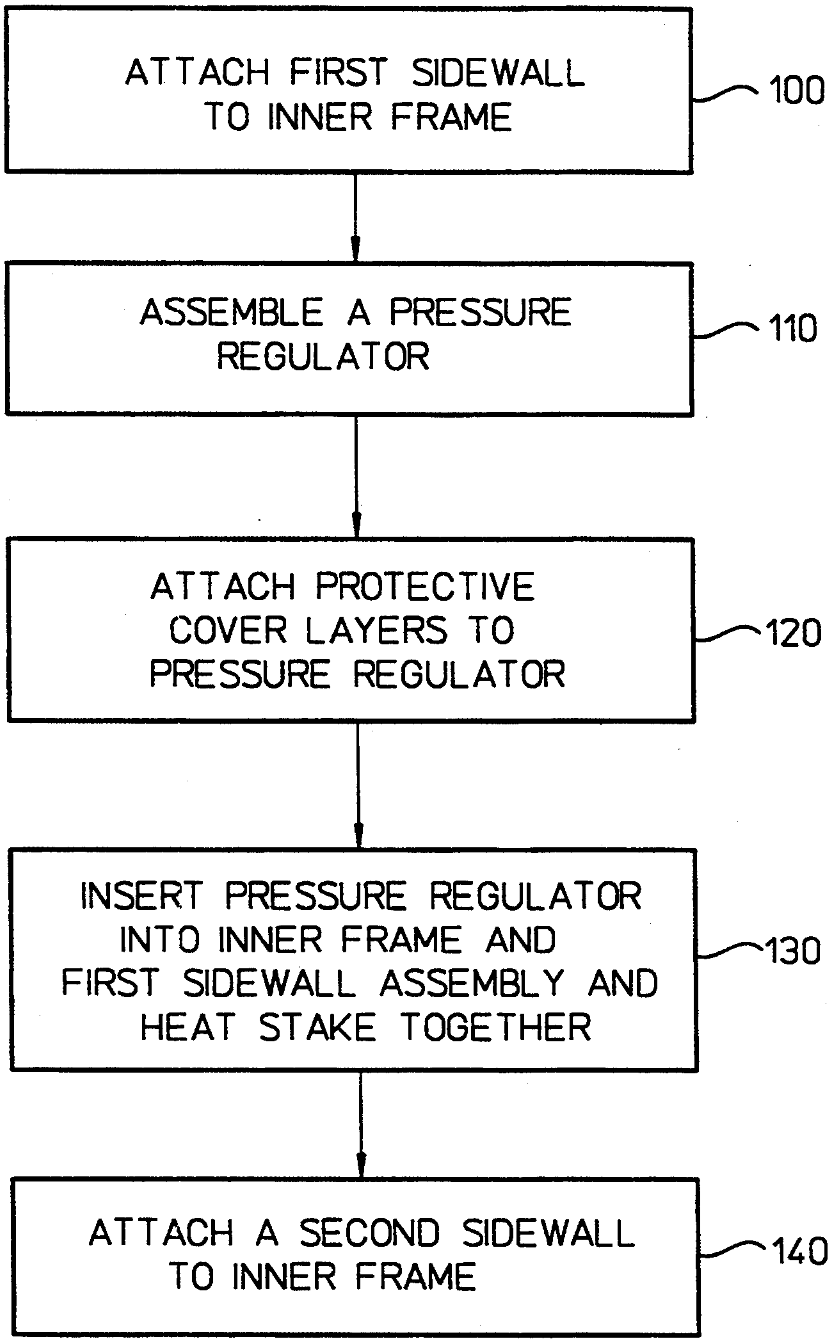
FIG. 7 is a flow diagram showing a procedure for assembling an ink reservoir.

Referring to FIG. 7, at step 120, the protective cover layers 38, 39 are adhered to sideplates 32, 34. At this point, the assembly of pressure regulator 30 is complete and pressure regulator 30 has the appearance shown in FIG. 12.

At step 130, pressure regulator 30 is inserted into inner frame 20 with sidewall 42 attached after inner frame 20 is inverted. Protective cover layer 38 is then heat staked centrally to sidewall 42.

Figure 13:
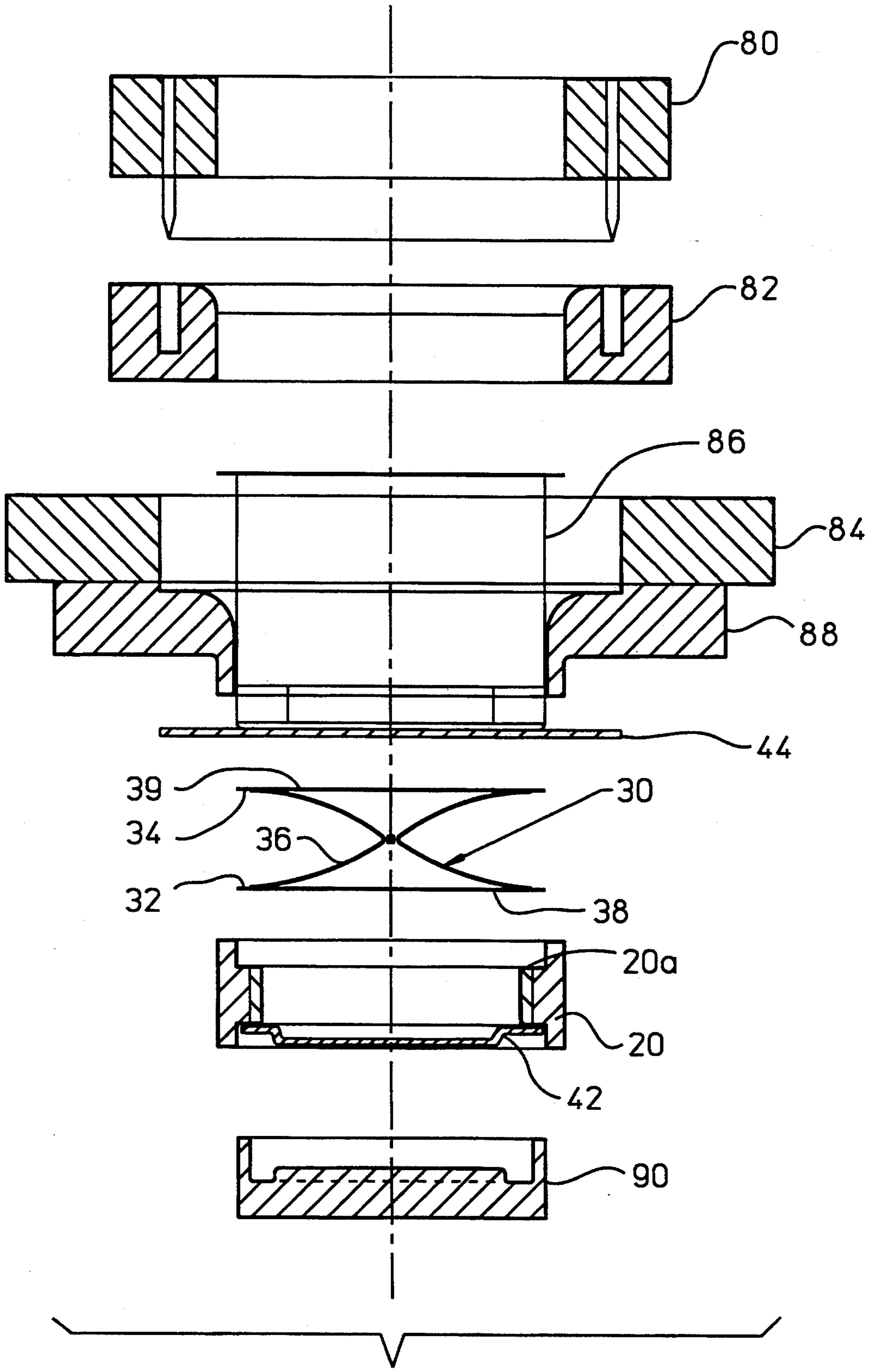
FIG. 13 is a sectional schematic view of a sidewall attachment mechanism.
Figure 14:
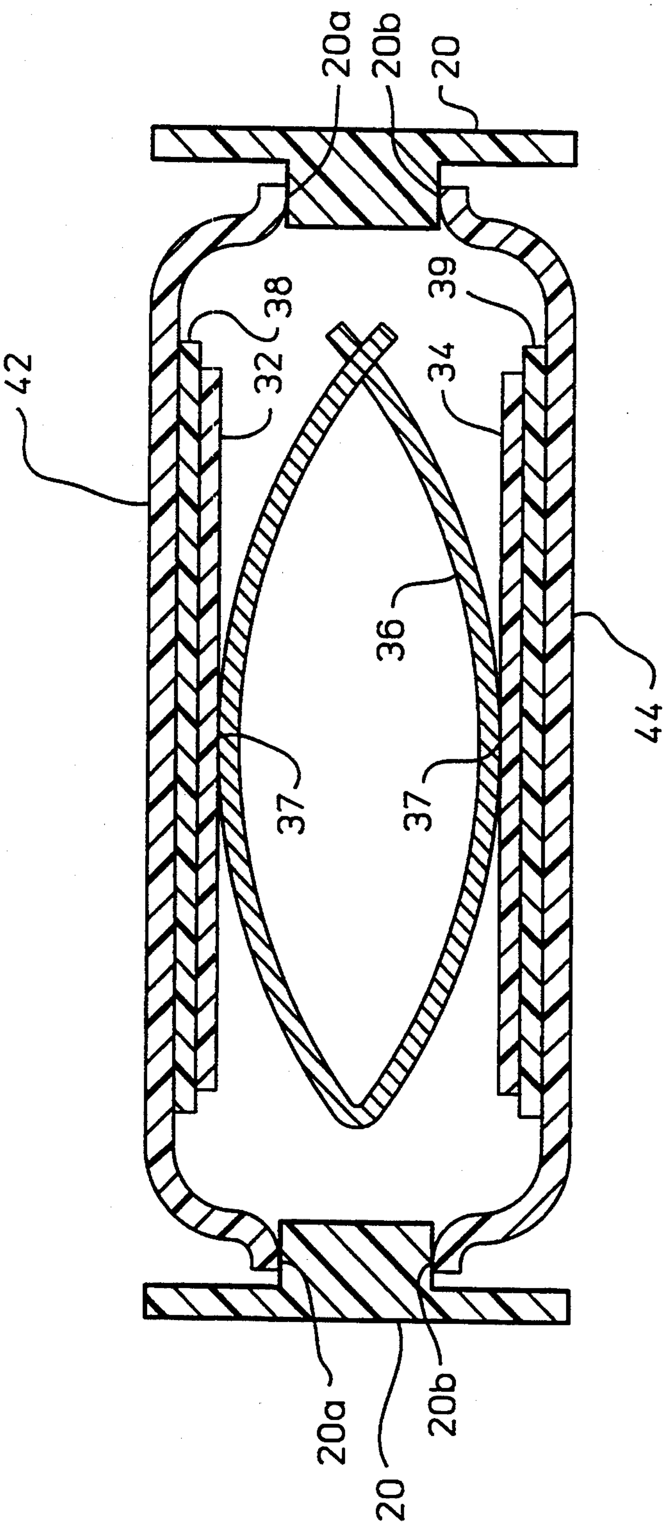
FIG. 14 is a sectional view of an assembled ink reservoir.

Referring to FIG. 7 in step 140, the second sidewall 44 is attached to the inner frame 20. The essential difference between step 140 and step 100, wherein the first sidewall 42 was attached to inner frame 20, is that pressure regulator 30 now rests inside of inner frame 20 and has been heat staked to sidewall 42 to maintain its central position. Referring to FIG. 13, the procedure takes place in a continuous manner wherein die cutter 80 and anvil 82 cut the sidewall 44 to the appropriate shape. Push form 86 then pushes sidewall 44 into the inner frame 20 while simultaneously frame lift block 90 comes upward to cause sideplate 44 to preform sidewall 44 in the same manner as discussed above for sidewall 42 except sideplate 34 of pressure regulator 30 is forced downward while push form 86 is preforming sidewall 44. The relative movement between push form 86 and heat stake die 88 must be sufficient for the edges of sidewall 44, which has larger dimensions than heat stake die 88, to clear heat stake die 88 and flatten out prior to heat staking. The purpose is the same as that discussed above for sidewall 42. Again this is a key step because the preforming of the wrinkles prior to heat staking creates a sidewall that will easily move inward without restriction as the ink reservoir is depleted. While being held in the appropriate position by push form 86 and frame lift box 90, the heater block 84 and heat stake die 88 heat stake the sidewall 44 to surface 20*b* of inner frame 20. Push form 86 will be approximately at the center of inner frame 20 at the point of heat staking. After heat staking is complete, push form 86, frame lift box 90, heater block 84 and heat stake die 88 are removed from inner frame 20. The pressure regulator 30 expands outwardly exerting pressure on sidewalls 42, 44 and the assembly is complete. An optional final step would be to heat stake protective cover layer 39 to sidewall 44. The completely assembled ink reservoir is shown in FIG. 14 in cross section.

Persons skilled in the art will readily appreciate that various modifications can be made from the preferred embodiment thus the scope of protection is intended to be defined only by the limitations of the appended claims. For example, an ink reservoir having a single flexible sidewall instead of two flexible sidewalls might be constructed. In this instance, the pressure regulator need only have a single sideplate urged into engagement by a spring with the single flexible reservoir wall.

What is claimed is:

1. A method of assembling a collapsible liquid ink reservoir for a liquid ink printer cartridge comprising the following steps:

attaching a first flexible sidewall to a peripheral frame member to form an open assembly for receiving other elements of the ink reservoir, said other elements including a pressure regulator and a second sidewall, said peripheral frame member comprising a peripheral outer frame element and an inner peripheral frame member attached to said outer frame member along an inner surface thereof, said inner frame member defining first and second opposite side edges, and wherein said first flexible sidewall is attached to said first side edge;

assembling a pressure regulator comprising first and second pressure regulator sideplates and biasing means for urging said sideplates to a separated configuration;

inserting the assembled pressure regulator into the open assembly; and attaching a second flexible sidewall to said second side edge of said inner frame member to form an enclosed assembly, wherein said pressure regulator is disposed between said first and second flexible sidewalls, and said ink reservoir is defined between said flexible sidewalls, said ink reservoir being free of any ink-absorbing material.

2. The method of claim 1 wherein said step of attaching said first sidewall comprises heat sealing said first sidewall to said peripheral frame member along said first side edge.

3. The method of claim 1 wherein said step of attaching said second sidewall comprises heat sealing said second sidewall to said peripheral frame member along said second side edge.

4. The method of claim 1 further comprising the step of attaching said first regulator sideplate to said first reservoir sidewall after said inserting step and prior to the step of attaching said second reservoir sidewall, thereby fixing the relative position of said regulator assembly in relation to said first reservoir sidewall.

5. The method of claim 1 wherein said first and second regulator sideplates comprise thin planar elements fabricated of a rigid material.

6. The method of claim 5 wherein said rigid material is stainless steel, and said thin planar elements are fabricated from a sheet of stainless steel.

7. The method of claim 5 wherein said biasing means comprises a bow spring comprising first and second opposed bights.

8. The method of claim 1 wherein said first and second sidewalls comprise a flexible polymer sheet material.

9. A method of assembling a collapsible liquid ink reservoir for a liquid ink printer cartridge comprising the following steps:

attaching a first flexible sidewall to a peripheral frame member along a first peripheral junction extending along a first side edge of said frame member to form an open assembly for receiving other elements of the ink reservoir, said other elements including a pressure regulator and a second sidewall;

assembling a pressure regulator comprising first and second pressure regulator sideplates, said sideplates comprising thin planar elements formed from stainless steel sheet material, and biasing means for urging said sideplates to a separated configuration, said biasing means comprising a bow spring comprising first and second opposed bights, said assembling step comprising providing said first and second sideplates, attaching said first bight to said first sideplate at an apex of said first bight, and attaching said second bight to said second sideplate at an apex of said second bight;

inserting the assembled pressure regulator into the open assembly; and attaching a second flexible sidewall along a second junction extending along a second side edge of said peripheral frame member to form an enclosed assembly, wherein said pressure regulator is disposed between said first and second flexible sidewalls, and said ink reservoir is defined between said flexible sidewalls, said ink reservoir being free of any ink-absorbing material.

10. The method of claim 9 wherein said assembling step further comprises the step of fabricating said bow spring bights, said step comprising forming each bight from a layer of springy metal, and bending each bight to form said apex.

11. The method of claim 10 wherein said first and second bights are formed from a continuous strip of said metal layer, and wherein a first end of said first bight and a first end of said second bight are connected together at a fold of said metal, and wherein a second end of said first bight and a second end of said second bight define mating surfaces which are brought into contact during said regulator assemble.

12. The method of claim 10 wherein said regulator sideplates are fabricated from said springy metal, and said bights are welded to respective ones of said sideplates.

13. A method of assembling a collapsible liquid ink reservoir for a liquid ink printer cartridge comprising the following steps:

attaching a first flexible sidewall to a peripheral frame member along a first peripheral junction extending along a first side edge of said frame member to form an open assembly for receiving other elements of the ink reservoir, said other elements including a pressure regulator and a second sidewall;

assembling a pressure regulator comprising first and second pressure regulator sideplates and biasing means for urging said sideplates to a separated configuration;

inserting the assembled pressure regulator into the open assembly;

attaching said first regulator sideplate to said first reservoir sidewall, thereby fixing the relative position of said regulator assembly in relation to said first reservoir sidewall;

thereafter attaching a second flexible sidewall along a second peripheral junction extending along a second side edge of said peripheral frame member to form an enclosed assembly, wherein said pressure regulator is disposed between said first and second flexible sidewalls, and said ink reservoir is defined between said flexible sidewalls, said ink reservoir being free of any ink-absorbing material.

14. The method of claim 13 wherein said first sideplate is attached to said first sidewall by heat sealing said flexible sidewall to said sideplate at an area of said sideplate.

15. A method of assembling a collapsible liquid ink reservoir for a liquid ink printer cartridge comprising the following steps:

providing a peripheral frame structure defining an open loop, said frame structure comprising a first plastic material defining first and second opposite side edges;

attaching a first flexible sidewall to said first side edge of said peripheral frame member to form an open assembly for receiving other elements of the ink reservoir, said other elements including a pressure regulator and a second sidewall, said first sidewall comprising a first sheet of thin flexible plastic, wherein said first sidewall is attached to said first side edge by heat sealing, said attaching step comprising positioning a frame lift block tool under and in contact with said frame structure, pushing said first sidewall into an attaching position relative to said open loop, and pushing a heat stake die against an edge of said positioned sidewall from above said frame structure while supporting said frame structure from below said frame structure, thereby applying heat and pressure to said sidewall edge and said first edge of said frame structure, thereby heat welding said first sidewall edge to said first edge of said frame structure;

assembling a pressure regulator comprising first and second pressure regulator planar sideplates and a spring structure for urging said sideplates to a separated, generally parallel configuration;

inserting the assembled pressure regulator into the open assembly within said open loop; and attaching a second flexible sidewall to said second side edge of said peripheral frame member to form an enclosed assembly, said second sidewall comprising a second sheet of thin flexible plastic, wherein said second sidewall is attached to said second side edge by heat sealing, wherein said pressure regulator is disposed between said first and second flexible sidewalls, and said ink reservoir is defined between said flexible sidewalls, said ink reservoir being free of any ink-absorbing material.

16. The method of claim 15, wherein frame lift block tool includes a lift block surface defining a block surface shape generally conforming to a shape of said first sideplate, said lift block surface being disposed within said open loop structure to a nominal position at which said first sideplate is disposed when said reservoir is filled with ink, said sidewall is pushed into said attaching position by a push form tool, and wherein said push form tool and said frame lift block surface pre-shape said flexible sidewall into a shape into which said sidewall is urged by said first sideplate when said reservoir is filled with ink.

17. The method of claim 16 wherein said lift block surface has a generally rectilinear shape defining corners, and wherein said pre-shaping of said flexible sidewall includes forming wrinkles at corners of said sidewall, thereby facilitating collapse of said reservoir as ink is emptied from the reservoir.

* * * * *